United States Patent [19]

Bonga

[11] Patent Number: 4,645,894
[45] Date of Patent: Feb. 24, 1987

[54] TRAVELLING WIRE EDM APPARATUS PROVIDED WITH ELECTRODE WIRE CHANGER

[75] Inventor: Benno I. Bonga, Crans, Switzerland

[73] Assignee: Charmilles Technologies S.A., Geneva, Switzerland

[21] Appl. No.: 593,864

[22] Filed: Mar. 27, 1984

[51] Int. Cl.$^4$ .................. B23H 1/00; B23H 7/10; B65H 49/00

[52] U.S. Cl. .................. 219/69 W; 204/206; 219/69 E; 242/122

[58] Field of Search ............ 140/92.1, 93 R; 219/69 W, 69 E, 69 M, 69 R; 242/128; 204/206

[56]  References Cited

U.S. PATENT DOCUMENTS

| 2,828,928 | 4/1958 | Kollisch | 242/128 |
| 2,866,079 | 12/1958 | Morley, Jr. et al. | 219/137.44 |
| 3,804,130 | 4/1974 | Tarbox et al. | 140/93 R |
| 3,891,819 | 6/1975 | Ullmann et al. | 219/69 W |
| 3,947,943 | 4/1976 | Kokubo et al. | 140/92.1 |
| 4,239,952 | 12/1980 | Rhyner | 219/69 W |
| 4,243,864 | 1/1981 | Vieau et al. | 219/69 W |
| 4,343,237 | 8/1982 | Endruhn | 140/93 R |
| 4,350,864 | 9/1982 | Janicke et al. | 219/69 W |
| 4,363,949 | 12/1982 | Pfau et al. | 219/69 W |
| 4,418,263 | 11/1983 | Inoue | 219/69 W |

FOREIGN PATENT DOCUMENTS

| 1136181 | 9/1962 | Fed. Rep. of Germany | 242/128 |
| 56-69037 | 10/1981 | Japan | 219/69 W |
| 196926 | 11/1983 | Japan | 219/69 W |

Primary Examiner—A. D. Pellinen
Assistant Examiner—Geoffrey S. Evans
Attorney, Agent, or Firm—Hauke & Patalidis

[57]  ABSTRACT

An EDM electrode wire changer has a plurality of conduits, one for each available electrode wire, all conduits converging towards the threading axis of a selected electrode wire through the workpiece or, alternatively, disposed substantially parallel on a slide that is indexable such as to dispose the outlet of a selected one of the conduits in alignment with the threading axis. A common motor-driven threading roller is disposed proximate the inlet of the conduits in a stationary position relative to the conduits, and a pinch roller for each wire co-operates with the threading roller for feeding the selected one of the wires through its corresponding conduit by forcing the selected wire against the peripheral surface of the common threading roller, while the other pinch rollers are remaining in a position away from the threading roller.

4 Claims, 3 Drawing Figures

TRAVELLING WIRE EDM APPARATUS PROVIDED WITH ELECTRODE WIRE CHANGER

BACKGROUND OF THE INVENTION

The present invention relates to travelling wire EDM apparatus, or apparatus for machining, by electrical discharges, an electrode workpiece by means of an electrode wire. More particularly, the present invention is addressed to a mechanism for automatically changing the electrode wire of a travelling wire EDM apparatus without human intervention.

It is known, in travelling wire electrical discharge technology, that it is advantageous to select an electrode wire best suited to the work to be effected. For example, while making a die for use in a stamping press, minimum radii of the co-operating punch and die are determined as a function of the thickness of the sheet steel stock to be cut. The greater the thickness of the sheet of steel, the larger are the minimum radii. Consequently, the punch and the die, which are obtained by electrical discharge machining, must have the dimensional and shape details which are appropriate for the part to be stamped, and the diameter of the electrode wire used for cutting the die must preferably conform to the desired degree of definition of the fine details of the die. Extremely detailed dies require the use of very slender electrode wires.

It is even sometimes necessary to use electrode wires of different compositions. For example, if it is desired to obtain very fine details, it is advantageous to use a molybdenum electrode wire, rather than a more conventional bronze or copper electrode wire, as molybdenum is a metal having very high strength under traction which thus permits to adopt an electrode wire of very small diameter.

Japanese Pat. No. 69.037-81 discloses a travelling wire EDM apparatus with automatic threading of the electrode wire and with the capability of selecting an electrode wire from several available wires. However, the disclosed structure is cumbersome and expensive because it results in a redundant multiplication of the number of wire feeding mechanisms for feeding the electrode wires to the machining zone of the apparatus. In other words, for each electrode wire capable of being used, there is a separate supply, feeding and guiding mechanism, such that the number of wire feeding mechanisms is a direct function of the number of separate wires which are capable of being used by the apparatus.

SUMMARY OF THE INVENTION

The principal object of the present invention is to enable a travelling wire EDM apparatus to effectuate consecutive closed path cuts, either on a single workpiece or on a plurality of workpieces, with automatic electrode wire change. An EDM apparatus equipped with the electrode wire changer of the invention is entirely automatic, which enables the machine to work a full night shift, for example, without human intervention.

A further object of the invention is to combine, within a particularly compact assembly, an electrode wire changer and threading mechanism which is capable of handling, for example, half a dozen of different electrode wires and of controllably selecting the best wire for each machining operation.

The apparatus of the invention is characterized in that it comprises at least two electrode wire guiding means disposed in close proximity, between the respective locations of the wire supply and of the workpiece, each guiding means being in the form of a conduit containing a portion of an electrode wire previously straightened and cut off. The apparatus further comprises means for aligning a selected electrode wire with a wire threading axis, and a mechanism capable of selectively feeding each of the electrode wires.

The many objects and advantages of the present invention will become apparent to those skilled in the art when the following description of the best mode contemplated for practicing the invention is read in conjunction with the accompanying drawing wherein:

DETAILED DESCRIPTION OF THE PREFERRED EMBODIMENTS

Figure 1:
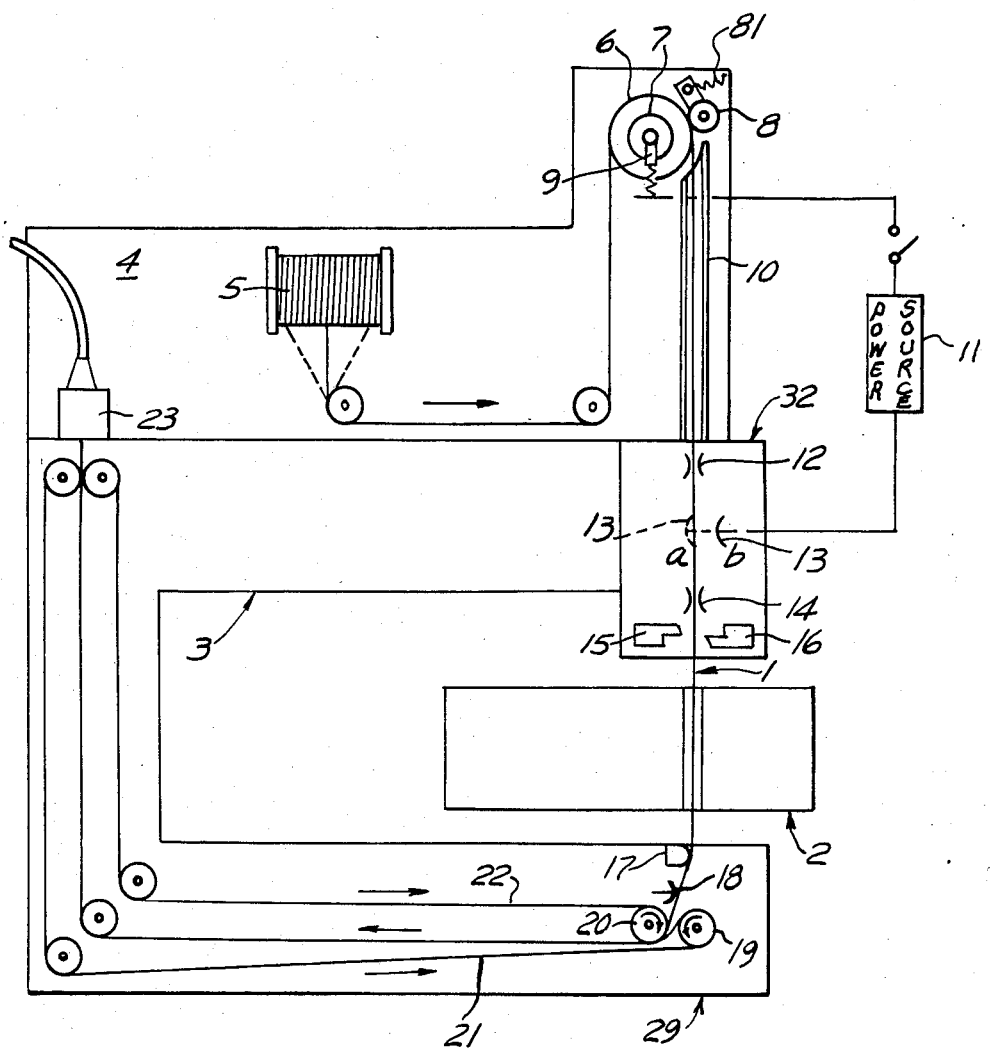
FIG. 1 schematically illustrates a travelling wire EDM apparatus showing an electrode wire threading mechanism according to the present invention, limited, for the sake of clarity, to a single wire threading mechanism.

Referring to FIG. 1, thee is illustrated a travelling wire EDM apparatus provided with an electrode wire 1 for cutting through a workpiece 2, the electrode wire 1 being stretched between appropriate wire feed and guide means mounted on the lower and upper arm of a C-shaped frame 3, a plate 4 being mounted on or above the upper arm. A pulse generator, not shown, is connected across the workpiece 2 and appropriate contacts or brushes 13 and 18 in engagement with the electrode wire 1, the contacts or brushes 13 and 18 being electrically connected in parallel. The pulse generator supplies electro-erosive electrical discharges between the electrode wire 1 and the workpiece 2. At least two servo motors, not shown, controlled by the central processor unit of a numerical control, not shown, displace the electrode wire 1 and the workpiece 2 relative to each other in such manner that a cut of an appropriate path is effected in the workpiece 2, as is well known in the art. The electrode wire feed mechanism mounted on the plate 4 comprises a wire supply spool 5 supplying the electrode wire 1 around a pulley or roller 6 driven by an electric motor 7 which, during normal machining, exerts a braking torque upon the roller 6, and to a pair of electrode wire guide members 12 and 14 mounted in a block 32 disposed upstream of the workpiece 2. An electrode wire guide member 17 is disposed downstream of the workpiece 2, a wire pulling conveyor mechanism, generally designated at 29, catching the wire after passage through the workpiece 2 between two pulleys 19 and 20 which supports a pair of engaged endless belts 21 and 22. A drive motor, not shown, drives the wire conveyor mechanism 29, such as to pull the electrode wire 1 at a predetermined speed and cause the electrode wire to be constantly renewed in the machining zone between the electrode wire 1 and the workpiece 2, where the electrode wire is also subjected to the erosive action of the machining electrical discharges. Means, as shown at 23, are provided at the outlet of the used electrode wire conveyor mechanism 29 for evacuating the used electrode wire to an appropriate electrode wire disposal location.

The electrode wire 1 is pulled at a constant velocity by the wire conveyor mechanism 29, consisting of the pulleys 19 and 20 and of the conveyor belts 21 and 22, as a result of the motor 7 coupled to the roller 6 exerting a braking torque on the roller. The braking torque applied by the motor 7 on the roller 6 is adjusted electrically by means of an appropriate control, not shown, such as to controllably adjust the traction force exerted on the electrode wire 1.

After a cut has been effected on a workpiece 2, and it is desired to effect an additional cut either on the same workpiece or on another workpiece, it is first necessary to cut off the electrode wire 1, because the cut effected through the workpiece 2 is along a closed path. After the electrode wire 1 has been cut off, the workpiece 2, or another workpiece, is displaced relative to the longitudinal axis of the electrode wire such as to align the end of the electrode wire with a predrilled starting hole through the workpiece, in preparation to threading the electrode wire 1 through a starting hole or aperture in the workpiece.

However, before cutting off the electrode wire 1 it is advantageous to subject the electrode wire to a straightening action such as to wipe out the permanent deformations of the wire due to its winding around the supply spool 5 and its passage over diverse pulleys and rollers. The electrode wire 1 is straightened by exerting a pull on the electrode wire with a force sufficient to cause a plastic deformation of the wire; in addition, the straightening action is still improved by heating the electrode wire to several hundred degrees, for example by heating the wire to the red. Such a straightening operation is particularly convenient for a copper or bronze electrode wire. It is to be noted that the higher the temperature to which the electrode wire is heated, the lower must the traction force exerted on the wire be in order to avoid rupture of the wire. The electrode wire 1 is heated for example by means of an electrical power source 11 controllably connected across a brush contact 9 in engagement with the roller 6 and the contact or brush 13 in engagement with the electrode wire and normally used for connecting the electrode wire to the pulse generator. While being heated, the electrode wire 1 is within an enclosure in the form of a tube or conduit 10, preferably made of a refractory material, thermally insulating the electrode wire from the ambient.

The sequence of operations for threading the electrode wire 1 through the workpiece 2 is as follows:

The first step consists in shutting off the pulse generator and the servo motors effecting the relative displacement between the workpiece 2 and the electrode wire 1. The used wire conveyor mechanism 29 is slowed down, the braking torque exerted by the motor 7 coupled to the roller 6 is decreased, and the electric wire is heated by switching on the power supply 11 for a few or several seconds.

The next step consists in shutting off the electrode wire heating, stopping completely the longitudinal feed of the electrode wire and cutting off the end of the wire by means of knives 15 and 16 mounted in the block 32, while retracting the contact or brush 13 from its position a to its position b. The contact or brush 13 and the knives 15 and 16 are actuated by appropriate actuators, not shown, which can be, for example, electromagnets, or hydraulic or pneumatic jacks.

The third step consists in displacing the electrode wire 1 and the workpiece 2 relative to each other such that the starting hole or aperture in the workpiece is aligned along the axis of the wire guide members 12, 14 and 17.

The fourth step of the threading operation comprises starting the motor 7 coupled to the roller 6 for driving the electrode wire 1 through the starting hole or aperture in the workpiece. A pinch pulley or roller 8 applies the electrode wire 1 against the peripheral surface of the driven roller 6, by way of a spring 81. The pinch roller 8 prevents slippage of the electrode wire 1 relative to the peripheral surface of the roller 6, which enables the electrode wire to be driven by the roller 8 through the conduit 10 that acts as a guiding means disposed along the electrode wire threading axis. The electrode wire has no well defined direction of travel after leaving the portion of the peripheral surface of the roller 6 against which it is applied by the pinch roller 8, and the guiding conduit 10 directs the electrode wire towards the electrode wire guide members 12 and 14 disposed above the workpiece 2. In addition, the tube or conduit 10 opposes any excessive bending of the electrode wire resulting from the friction exerted on the electrode wire by the guide members 12 and 14 and the friction caused by engagement against the walls of the starting hole or aperture in the workpiece. As the electrode wire is driven in compression rather than in traction, the conduit 10 prevents excessive bending of the wire, and it is preferable to have the conduit 10 be of a relatively small diameter and sufficiently long such that the non-straightened portion of the electrode wire fed by the pulley 6 is entirely contained within the conduit 10 in the course of the threading operation.

The fifth and final step occurs when the end of the electrode wire 1, projecting through the workpiece 2, is caught between the conveyor belts 21 and 22 which pull the electrode wire at a speed greater than that defined by the speed of rotation of the roller 6. As soon as this occurs, the drive function of the roller 6 terminates and the brake function begins. The movable contact 13, which was in its retracted position b, is displaced to its working position a. It is to be noted that, in its working position a, the movable contact 13 pushes the electrode wire 1 laterally beyond the axis defined by the guide members 12 and 14 such that the contact 13 engages the electrode wire peripherally with sufficient pressure to ensure a good electrical contact and for engaging the electrode wire firmly against the guiding surfaces of the guide members 12 and 14. The re-engagement of the contact 13 with the electrode wire 1 marks the end of the threading operation, because everything is now in order for the start of a machining operation.

It will be readily apparent to those skilled in the art that all the electrical, pneumatic or hydraulic components of the EDM apparatus are controlled by an appropriate control unit, not shown in the drawing, adapted to provide appropriate control command signals to trigger the operation of the components in the appropriate sequence previously described. In such manner, the driving mode or brake mode of the electric motor 7 driving the roller 6, the turning on and off of the electrode wire heating power source 11, the operation of the movable contact 13, of the wire cut-off knives 15 and 16, and of the drive motor for the used electrode wire conveyor mechanism 29, are upper the dependence of the control unit, not shown. Such control units are well known in the machine tool electric control and numerical control art, and such control units are outside the scope of the present invention. The control unit is in turn controlled by the EDM apparatus numerical control central processor unit which determines the paths and sequence of cutting operations, the control of the electrode wire threading operation being achieved such that a small number of instructions, generally a single instruction, addressed to the execution of a program triggers the complete sequence of steps.

Figure 2:
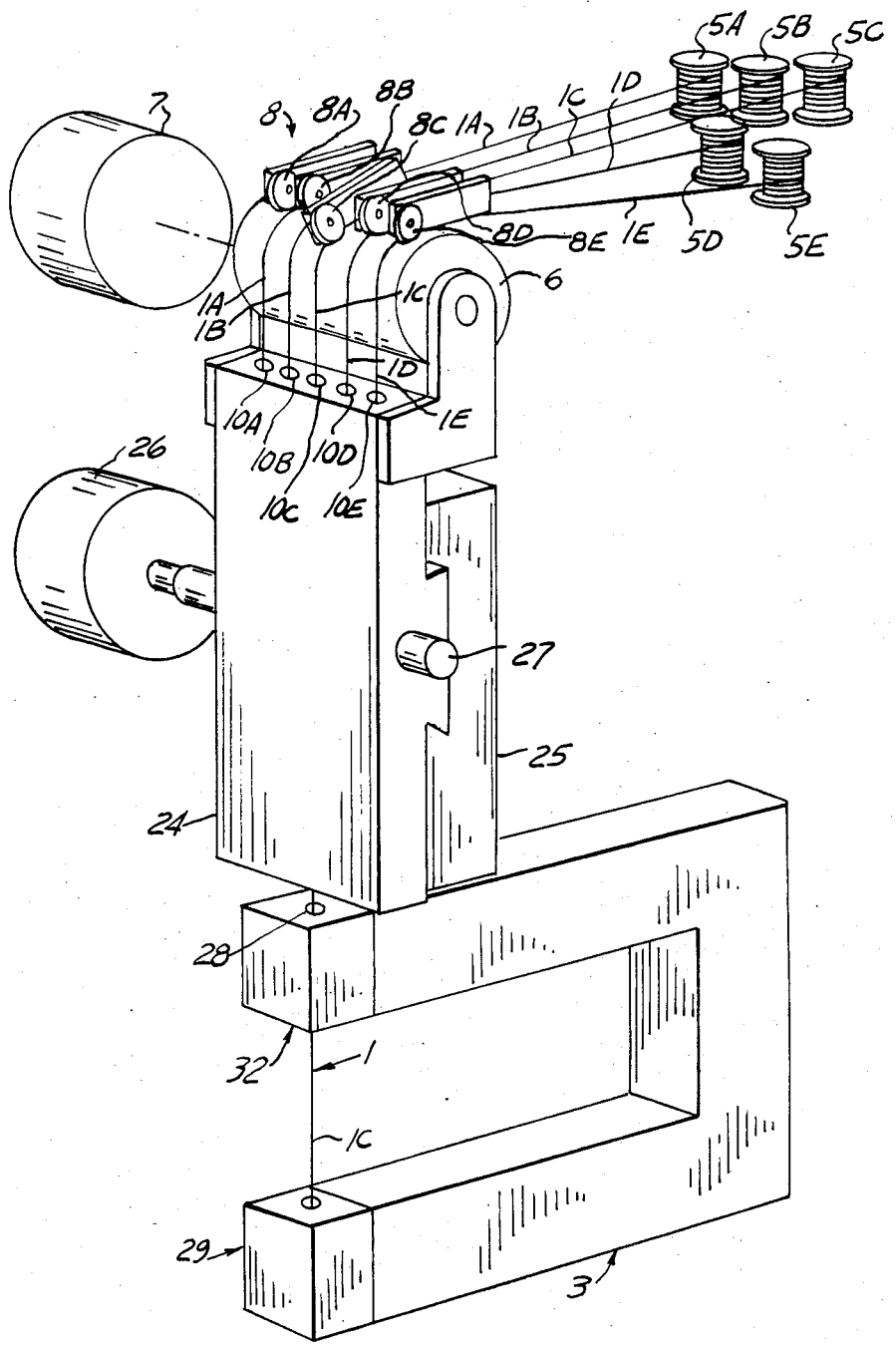
FIG. 2 schematically illustrates an example of structure for an electrode wire changer.

Referring now to FIG. 2, there is illustrated schematically and in perspective an example of structure for an electrode wire changer capable of selecting and feeding one of a plurality of electrode wires 1A through 1E, for example. In the structure of FIG. 2 five different electrodes wires are thus available, and it will be readily apparent to those skilled in the art that the number of available electrode wires has been arbitrarily chosen as five, but could be more or less than five.

Each wire 1A through 1E is obtained from an individual supply spool, 5A through 5E. The wires 1A through 1E are wrapped in parallel around a portion of the periphery of a common feed roller 6 driven by the electric motor 7 which, as previously mentioned, is operable in a driving mode or in a brake mode. Each of the wires is capable of being firmly engaged with the periphery of the roller 6 by means of one of a plurality of pinch rollers 8A through 8E, five in number in the example of structure illustrated, according to which one of the individual pinch rollers is actuated, by an appropriate means such as solenoid, not shown, such as to be brought in engagement with the roller 6, thus pinching between the peripheral surface of the selected pinch roller and the surface of the feed roller 6 an appropriately selected wire, the other wires being out of contact from the periphery of the roller 6. A shallow groove, not shown, may be formed on the peripheral surface of the roller 6, for acting as a guide for each of the wires 1A through 1E.

The single electrode wire guide tube or conduit 10 of FIG. 1 is replaced in the structure of FIG. 2 by a plurality of cylindrical conduits 10A through 10E, disposed parallel in a single plane and in proximity ot each other in a slide 24 on the top of which is mounted the feed roller 6. The slide 24 is slidably supported by a support block 25 affixed to the top of the upper arm of the EDM apparatus frame 3. The slide 24 is displaceable relative to the support block 25 by a servo motor 26, for example, driving a leadscrew 27. It will be appreciated by those skilled in the art that other means than the electric motor 26 could be used for laterally displacing the slide 24, such as, for example, a stepping linear positioner, for the purpose of indexing the outlet of an appropriate one of the conduits 10A through 10E with the longitudinal axis of displacement of the electrode wire through the block 32, such longitudinal axis being arbitrarily represented by line 28 at FIG. 2.

In the example of structure schematically illustrated at FIG. 2, the wire 1C is shown as being in use as the electrode wire 1, the pinch roller 8C being in its operative position in engagement with the roller 6, thus applying the wire 1C around the periphery of the roller 6, the wire 1C being fed to the block 32 through the conduit 10C in the slide 24. The other pinch rollers 8A, 8B, 8D and 8E are retracted away from the periphery of the roller 6, such that the roller 6 has no action on the wires 1A, 1B, 1D and 1E. Threading of the wire 1C through the starting hole in a workpiece, not shown for the sake of clarity but normally disposed between the upper and lower arms of the EDM apparatus frame 3, is thus effected by the roller 6 driven by the motor 7 functioning in its threading mode. Machining of the workpiece is then effected in a normal manner.

At the end of a cutting operation, or more specifically at the end of a cutting operation effected by way of the wire 1C in the example of operation chosen, if it is desired to select another electrode wire, the first two of the five steps precedently described with respect to the operation of the apparatus of FIG. 1 take place. After the wire 1C has been cut off, it is retracted above the block 32 by an appropriate program command reversing the direction of rotation of the motor 7 driving the roller 6, Subsequently, the servo motor 26 is activated such as to displace the slide 24 to index an appropriate one of the cylindrical conduits 10A through 10E with the electrode wire threading axis 28. The corresponding wire 1A, 1B, 1D or 1E is thus engaged by its appropriate pinch roller 8A, 8B, 8D or 8E in frictional engagement with the peripheral surface of the roller 6, such as to thread the appropriate wire through the workpiece until the end of the wire is captured by the used electrode wire conveyor mechanism 29, and the EDM apparatus is ready to effectuate another cutting operation, the motor 7 of the roller 6 being activated to its brake mode.

It is readily apparent that the operations of the motor 26, of the motor 7, and of the positioning mechanism for the pinch rollers 8A through 8E are under the dependence of an appropriate numerical control program, and that the operation of the EDM apparatus is entirely automatic, including the electrode wire threading and rethreading operations, and the selection of an appropriate electrode wire according to the command signals obtained from the program.

It will be appreciated by those skilled in the art that, rather than disposing the electrode wire cut-off mechanism, or knives 15–16 at the bottom of the block 32 as illustrated at FIG. 1, the electrode wire cut-off mechanism may be disposed between the block 32 and the slide for the purpose of cutting off the electrode wire t the end of a workpiece cutting operation with that electrode wire and prior to displacing the slide 24 for aligning one of the conduits 10A through 10E with the predetermined electrode wire threading axis 28 through the block 32. With such an arrangement, the step of retracting the cut-off electrode wire from the block 32 into its corresponding conduit 10A, 10B, 10C, 10D or 10E of the slide 24, through reversal of the direction of drive of the motor 7, can be omitted.

Figure 3:
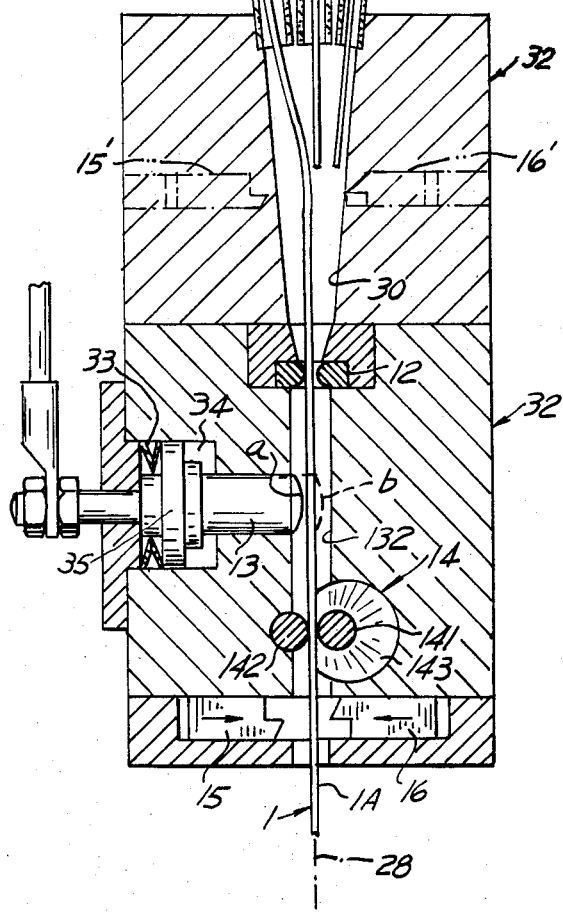
FIG. 3 schematically illustrates another example of structure for an electrode wire changer for a relatively small number of electrode wires.

Referring now to FIG. 3, there is illustrated in some details the electrode wire guide members, the electrical contacts and the cut-off mechanism disposed in the housing or block 32. The block 32, which can be made of metal or plastic, has a channel 132 for passage therethrough of the electrode wire 1. The electrode wire upper guide member 12, which takes the form of a metal carbide or sapphire annular insert, is disposed at the top of the block 32, and the electrode wire lower guide member 14 is disposed at the bottom, above the wire cutting knive 15–16. The electrode wire upper guide member 12 is generally shaped as a wire drawing die, however with a central opening sufficiently larger than the outer diameter of the electrode wire 1 for allowing the electrode wire to freely pass through the electrode wire guide member 12. The electrode wire lower guide member 14 preferably takes the form illustrated, and consists of a metallic rod 142, shown in section and disposed on one side of the channel 132, a second metallic rod 141 being disposed substantially parallel and tangentially to the rod 142 in the opposite side of the channel 132. The rod 141 has a peripheral V-groove 143 cut with an axis substantially eccentric relative to the centerline of the rod 141, the rod 141 being illustrated at FIG. 3 in cross-section through the bottom of the peripheral V-groove 143. In this manner, the electrode wire 1 is disposed through the V-groove 143 at a portion thereof which is relatively shallow, and the portion of the V-groove open to the channel 132 forms a funnel-shaped inlet through the wire guide member 14 aiding in guiding the electrode wire when pushed therethrough, and presenting no abutment surface on which the end of the electrode wire could hang up.

The electrical contact 13 which, as previously mentioned, acts as a means for connecting the electrode wire 1 to a pulse generator for supplying the machining current to the electrode wire, and for connecting a portion of the electrode wire across a source of electric power for heating the electrode wire during the straightening and annealing step referred to hereinbefore, takes the form of a reciprocable plunger urged by a spring 33 from its retracted position a, shown in full line, to its extended and working position b shown in dashed line. While occupying the extended working position b, the tip of the contact 13 engages the electrode wire 1 laterally and urges it in engagement with a side of the upper guide member 12 and into the bottom of the groove 143 in the lower guide member 14, which acts as a reference surface for aligning the longitudinal axis of the electrode wire with a reference axis of longitudinal travel for continuously renewing the electrode wire at the machining zone during a normal machining operation. The contact 13 is retracted by a pressurized fluid introduced into an annular chamber 34 disposed on one side of a piston 35 formed integral with the body of contact 13. Once again, it will be appreciated that the mechanism for actuating the contact 13 from its extended position b to its retracted position a may take any appropriate form such as consisting of the plunger of an electrical solenoid, or the like, the only functional requirement being that the contact 13 be controllably retractable such as to offer free passage to the electrode wire between the guide members 12 and 14 during threading or rethreading of the electrode wire, and to establish a good electrical contact with the electrode wire while causing the electrode wire to be appropriately and precisely aligned, as a result of being engaged with the bottom of the groove 143 in the lower guide member 14, during cutting of the workpiece.

FIG. 3 further illustrates a structure for an electrode wire changer, or distributor, which does not comprise any moving parts, and which does not require a servo motor for its operation. The illustrated electrode wire changer or distributor, designated generally at 31 at FIG. 3, is fixedly mounted on the top of the block 32. The changer or distributor 31 takes the form of a block provided with a funnel-shaped passageway 30 converging towards the inlet of the electrode wire upper guide member 12 in the block 32. Three electrode wire guiding tubes or conduits 10A, 10B and 10C are illustrated with their outlet end fitted in the inlet of the conical passageway 30, with a wire 1A disposed through the wire guide conduit 10A, another wire 1B disposed through the electrode wire guide conduit 10B and a third wire 1C disposed through the conduit 10C. Although only three wires 1A, 1B and 1C, and three electrode wire guiding tubes or conduits 10A, 10B and 10C have been illustrated, it will be readily apparent that two or more than three wire guide tubes or conduits may be fitted to the electrode wire distributor 31, in a fanned out manner, with the outlet of all the wire guide tubes converging into the conical passageway 30.

It will be appreciated that separate feed rollers 6 and pinch rollers 8 may be used for feeding each individual wire through its corresponding guide tube or conduit during a threading operation, after selection of the appropriate electrode wire to be used for a subsequent cutting operation, or an arrangement as illustrated at FIG. 2, may be used consisting of a single feed roller 6 provided with a plurality of individually controllable pinch rollers 8A through 8C. In the example of structure illustrated, the wire 1A is in the process of being threaded to function as an electrode wire, while the other wires 1B and 1C are in a stand-by mode. By disposing the electrode wire cut-off mechanism in the electrode wire distributor 31, as shown in phantom lines at 15'-16', rather than at the bottom of the block 32 as shown in full lines at 15-16, retraction of a cut-off electrode wire within its guide conduit through reversal of the direction of rotation of the roller 6 is avoided.

Having thus described the present invention by way of examples of structure well designed for accomplishing the objects of the invention, modifications whereof will be apparent to those skilled in the art, what is claimed as new is as follows:

1. In a travelling wire EDM apparatus wherein a cut is effected in a workpiece by way of electrical discharges across a machining zone formed between an electrode wire and the workpiece, said apparatus having means for displacing said electrode wire longitudinally stretched between a pair of electrode wire guide members along an electrode wire threading axis through the workpiece, one of said electrode wire guide members being above said workpiece and the other below said workpiece, an electrode wire changer comprising a plurality of wire supply spools, a plurality of wire guide conduits each having an inlet and an outlet, means for selectively feeding each one of said wires from each one of said wire supply spools through a single one of said wire guide conduits, means for straightening each of said wires in its corresponding guide conduits, wire cut-off means disposed proximate said electrode wire guide member above said workpiece, and means for substantially aligning the outlet of a selected one of said wire guide conduits along the electrode wire threading axis through the workpiece, whereby the outlet of the selected one of said wire guide conduits is aligned with said threading axis for threading through the workpiece the wire in the selected one of said wire guide conduits, wherein said means for substantially aligning the outlet of the selected one of said wire guide conduits comprises a slide fixedly supporting said wire guide conduits, and means for controllably displacing laterally said slide to any one of a plurality of finite positions wherein the outlet of one of said wire guide conduits is aligned with said threading axis.

2. The electrode wire changer of claim 1 wherein said means for selectively feeding each one of said wires through a single one of said guide conduits comprises a motor-driven roller and a plurality of pinch rollers, each one of said pinch rollers corresponding to one of said electrode wires, and means for selectively engaging a selected one of said pinch rollers for applying one of said wires on the peripheral surface of said roller.

3. In a travelling wire EDM apparatus wherein a cut is effected in a workpiece by way of electrical discharges across a machining zone formed between an electrode wire and the workpiece, said apparatus having means for displacing said electrode wire longitudinally stretched between a pair of electrode wire guide members along an electrode wire threading axis through the workpiece, an electrode wire changer comprising a plurality of wire supply spools, a plurality of wire guide conduits each having an inlet and an outlet, means for selectively feeding each one of said wires from each one of said wire supply spools through a single one of said wire guide conduits, means for straightening each of said wires in its corresponding guide conduit, wire cut-off means disposed proximate said electrode wire guide member above said workpiece, and means for substantially aligning the outlet of a selected one of said wire guide conduits along the electrode wire threading axis through the workpiece, whereby the outlet of the selected one of said wire guide conduits is aligned with said threading axis for threading through the workpiece the wire in the selected one of said wire guide conduits, wherein said means for substantially aligning the outlet of the selected one of said wire guide conduits with the electrode wire threading axis comprises said wire guide conduits being fixedly supported and angularly disposed relative to each other, said wire guide conduits converging towards said threading axis.

4. The electrode wire changer of claim 3 wherein said means for selectively feeding each one of said wires through a single one of said guide conduits comprises a motor-driven roller and a plurality of pinch rollers, each one of said pinch rollers corresponding to one of said electrode wires, and means for selectively engaging a selected one of said pinch rollers for applying one of said wires on the peripheral surface of said roller.

* * * * *

UNITED STATES PATENT AND TRADEMARK OFFICE
CERTIFICATE OF CORRECTION

PATENT NO. : 4,645,894

DATED : February 24, 1987

INVENTOR(S) : Benno I. Bonga

It is certified that error appears in the above-identified patent and that said Letters Patent is hereby corrected as shown below:

```
Col. 2, line 11, change "mode" to --modes--.

Col. 2, line 29, change "thee" to --there--.

Col. 3, line 65, change "a to its position b" to --a
     to its position b--.

Col. 4, line 42, change "position b" to --position b--.

Col. 4, line 43, change "position a" to --position a--.

Col. 4, line 67, change "upper" to --under--.

Col. 6, line 42, change "wire t" to --wire at--.

Col. 7, line 25, change "position a" to --position a--.
        line 26, change "position b" to --position b--.
        line 28, change "position b" to --position b--.
        line 41, change "position b" to --position b--.
```

Signed and Sealed this

Tenth Day of November, 1987

Attest:

DONALD J. QUIGG

Attesting Officer

Commissioner of Patents and Trademarks